US00RE45618E

(19) United States
(12) Reissued Patent
An

(10) Patent Number: US RE45,618 E
(45) Date of Reissued Patent: Jul. 21, 2015

(54) HEAD LAMP

(71) Applicant: HYUNDAI MOBIS CO., LTD., Seoul (KR)

(72) Inventor: You Kun An, Gyeonggi-do (KR)

(73) Assignee: Hyundai Mobis Co., Ltd., Seoul (KR)

(21) Appl. No.: 13/771,492

(22) Filed: Feb. 20, 2013

Related U.S. Patent Documents

Reissue of:
(64) Patent No.: 7,985,012
Issued: Jul. 26, 2011
Appl. No.: 12/250,836
Filed: Oct. 14, 2008

(30) Foreign Application Priority Data

Jul. 28, 2008 (KR) ..... 10-2008-0073753

(51) Int. Cl.
*F21V 7/00* (2006.01)
*F21V 7/04* (2006.01)
*F21S 8/10* (2006.01)

(52) U.S. Cl.
CPC ..... *F21S 48/1154* (2013.01); *F21S 48/1104* (2013.01); *F21S 48/1305* (2013.01); *F21S 48/321* (2013.01)

(58) Field of Classification Search
CPC ..... F21S 48/1154; F21S 48/1104; F21S 48/1305; F21S 48/321
USPC ..... 362/517, 519, 538, 539, 546, 547, 548, 362/549
See application file for complete search history.

(56) References Cited

U.S. PATENT DOCUMENTS

| | | | | | |
|---|---|---|---|---|---|
| 5,169,224 | A * | 12/1992 | Segoshi et al. | ..... | 362/539 |
| 5,169,234 | A * | 12/1992 | Bohm | ..... | 374/128 |
| 5,993,035 | A * | 11/1999 | May et al. | ..... | 362/547 |
| 6,698,912 | B2 * | 3/2004 | Yang | ..... | 362/516 |
| 6,736,524 | B2 * | 5/2004 | Albou | ..... | 362/228 |
| 6,874,233 | B2 * | 4/2005 | Harding | ..... | 29/897.34 |
| 2004/0120159 | A1 | 6/2004 | Nishizawa | | |
| 2005/0180139 | A1 | 8/2005 | Takeda et al. | | |
| 2005/0180156 | A1 * | 8/2005 | Iwasaki | ..... | 362/538 |
| 2006/0007694 | A1 | 1/2006 | Kim | | |
| 2006/0215415 | A1 | 9/2006 | Suzuki et al. | | |

* cited by examiner

*Primary Examiner* — James Menefee
(74) *Attorney, Agent, or Firm* — Finnegan, Henderson, Farabow, Garrett & Dunner, L.L.P.

(57) ABSTRACT

Disclosed herein is a head lamp. The head lamp includes a light source emitting light, a reflection plate reflecting the emitted light toward a lens, and a shield integrally formed with the reflection plate to intercept a portion of the light illuminated toward the lens. The head lamp can accurately adjust an illumination pattern of light through a reduction of assembly tolerance between components.

22 Claims, 6 Drawing Sheets

HEAD LAMP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a head lamp, and more particularly, to a head lamp capable of accurately adjusting an illumination pattern of light through a reduction of assembly tolerance between components.

2. Description of the Related Art

Generally, a halogen lamp or a gas discharge lamp is used as a light source of a front illumination system for vehicles.

The halogen lamp emits slightly red-based light having a color temperature of about 3200 K, and has a lifetime of up to 1,000 hours, causing continuous field problems.

Compared to the halogen lamp, the gas discharge lamp emits near-white light having a color temperature of about 4300 K, has a long lifetime, and is used in luxury vehicles despite being costly.

On the other hand, a light emitting diode (LED) has recently received attention as the light source of the front illumination system for vehicles since it emits light having a color temperature of about 5500 K, which is similar to that of sunlight and thus causes less eye fatigue than any other lamps.

Further, not only does the LED enable a size reduction to increase a degree of freedom in designing a lamp, but also has economic feasibility due to its semi-permanent lifetime.

The head lamp is provided with a shield for changing an illumination pattern of light emitted in front of a vehicle by partially restricting an illumination direction of light emitted from a light source, so that the head lamp can realize various patterns of light such as high beams and low beams by means of the shape of the shield.

However, since the conventional head lamp is fabricated by assembling a number of components with separate fastening members, it is difficult to realize an accurate pattern of light due to tolerance in the assembly of the components.

Therefore, there is a need for an improved head lamp that overcomes such a problem of the conventional head lamp.

SUMMARY OF THE INVENTION

The present invention is conceived to solve the above and other problems of the conventional techniques, and an aspect of the present invention is to provide a head lamp capable of realizing an accurate pattern of light by reducing assembly tolerance between components of the head lamp.

In accordance with an aspect of the present invention, a head lamp includes: a light source emitting light; a reflection plate reflecting the emitted light toward a lens; and a shield integrally formed with the reflection plate to intercept a portion of the light illuminated toward the lens.

The head lamp may further include a lens guide receiving the shield.

The lens guide may be provided with a collar jaw on which the shield is mounted, the collar jaw being formed with an insertion groove through which the shield is fitted into the collar jaw.

The shield may be formed with a through-hole through which a portion of light emitted from the light source passes, the through-hole being integrally formed with the reflection plate.

The reflection plate may have a seat-hole extending from the through-hole to define a passage of light and serving as a seat on which the light source is mounted, the seat-hole being formed with a coupling protrusion fitted into the light source.

The head lamp may further include a heat sink connecting the light source, wherein the lens guide is formed with a mounting hole to which the heat sink is fastened.

BRIEF DESCRIPTION OF THE DRAWINGS

The above and other features and advantages of the present invention will become apparent from the following description of preferred embodiments given in conjunction with the accompanying drawings, in which.

DETAILED DESCRIPTION OF THE INVENTION

Exemplary embodiments of the present invention will be described in detail with reference to the accompanying drawings hereinafter.

Herein, a head lamp for vehicles will be described as an example for convenience of description.

The drawings may be exaggerated in thickness of lines or scale of components for the purpose of descriptive convenience and clarity.

Furthermore, terms used herein should be defined in consideration of functions of components of the present invention and thus can be changed according to the custom or intention of users or operators.

Therefore, definition of such terms should be determined according to overall disclosures set forth herein.

Figure 1:
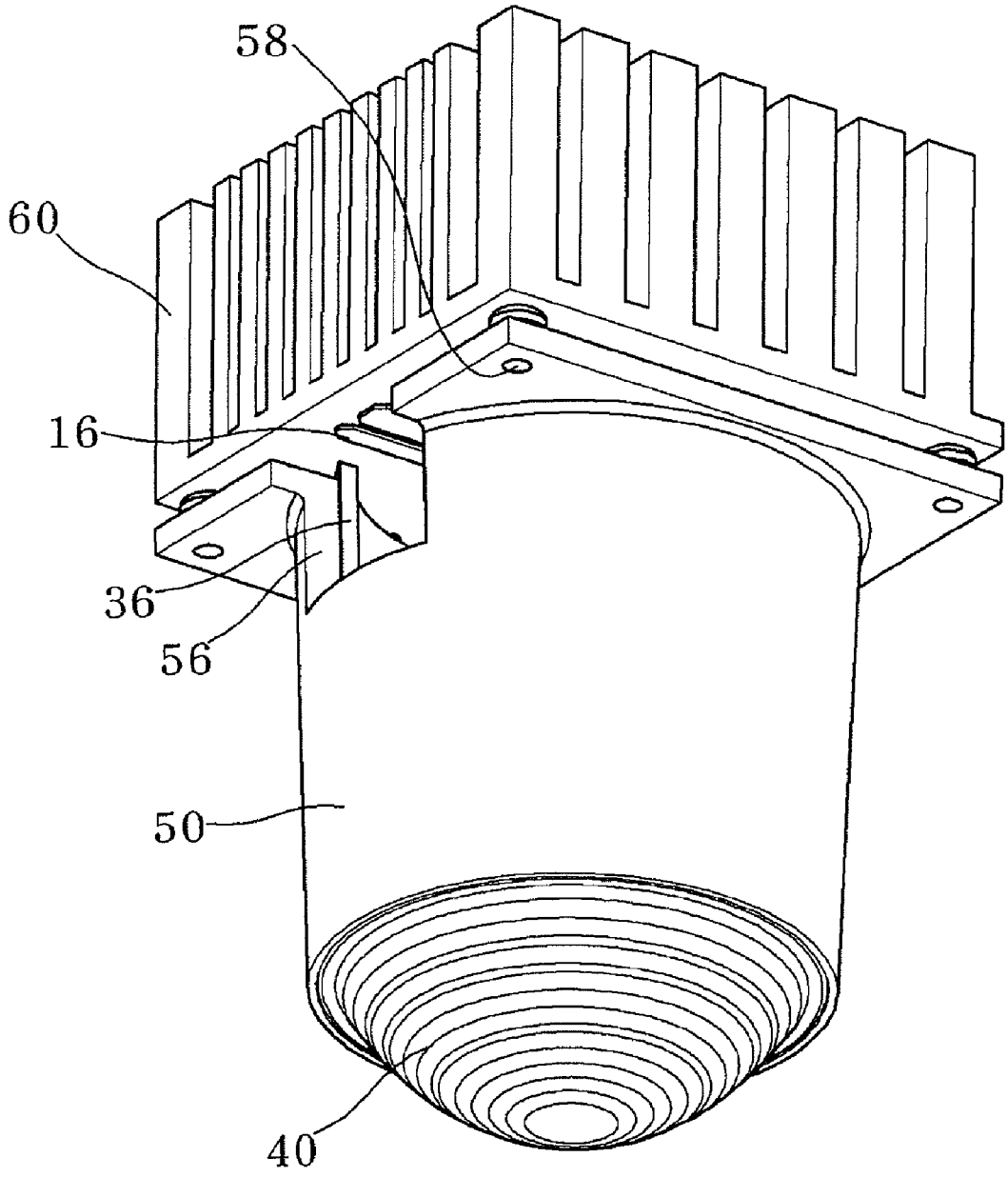
FIG. 1 is a perspective view of a head lamp according to one embodiment of the present invention.
Figure 2:
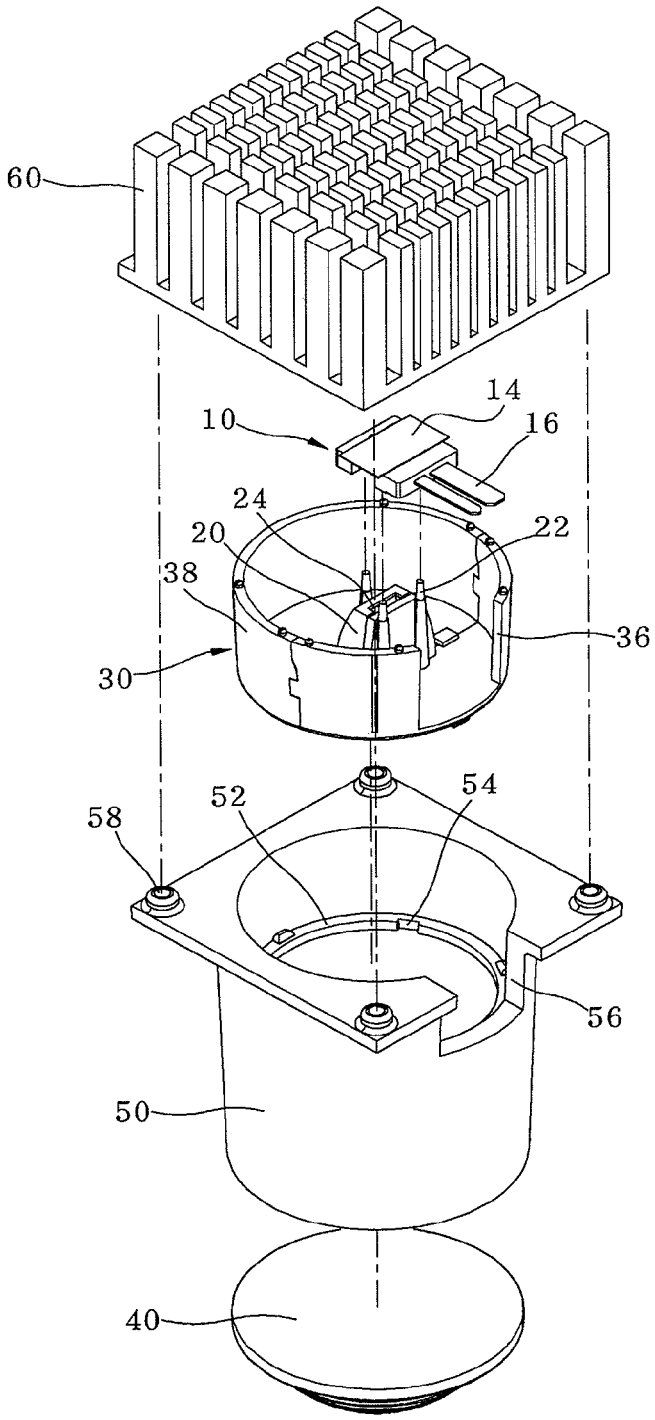
FIG. 2 is an exploded perspective view of the head lamp according to the embodiment of the present invention.
Figure 3:
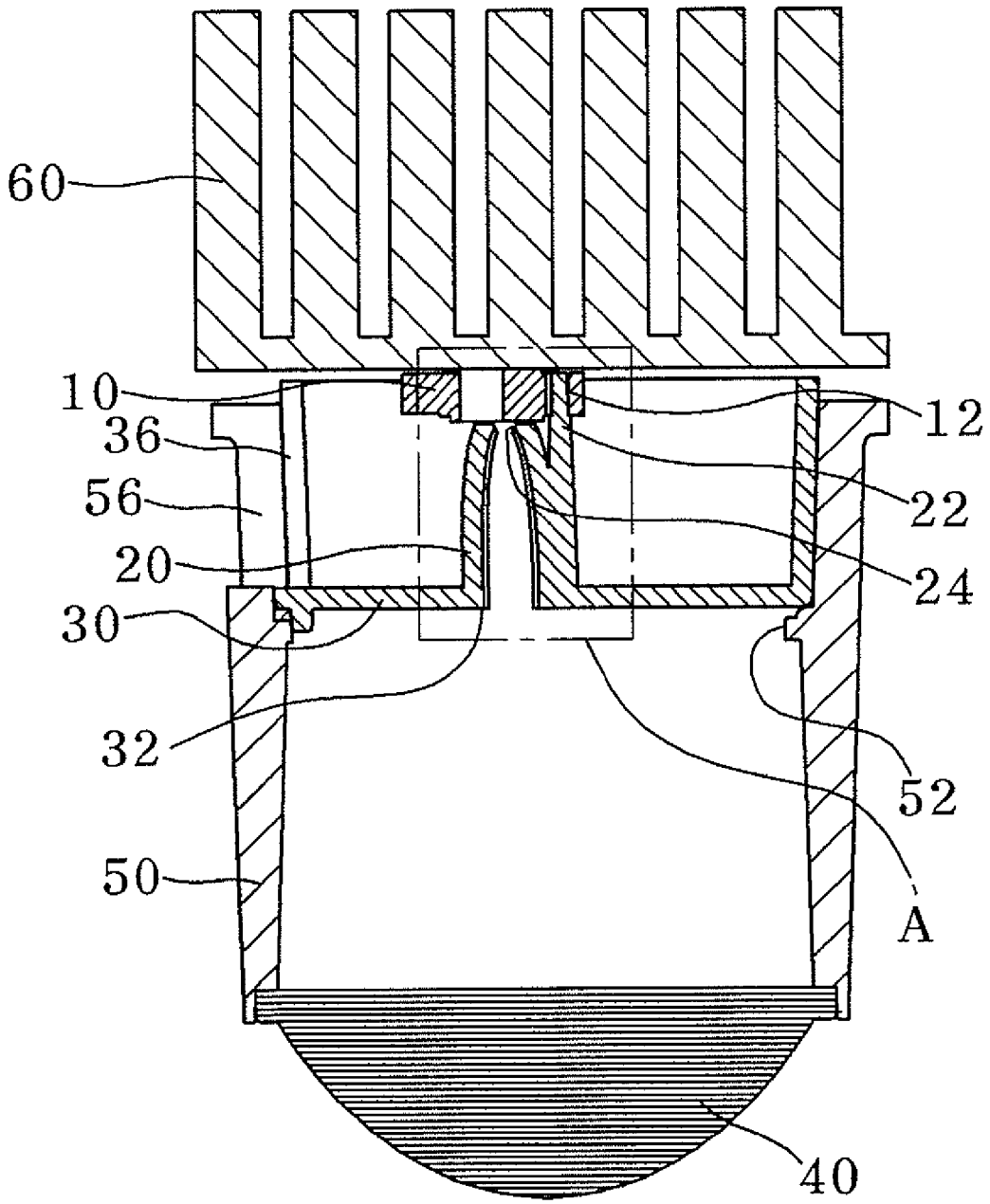
FIG. 3 is a cross-sectional view of the head lamp according to the embodiment of the present invention.

FIG. 1 is a perspective view of a head lamp according to one embodiment of the present invention, FIG. 2 is an exploded perspective view of the head lamp according to the embodiment of the present invention, and FIG. 3 is a cross sectional view of the head lamp according to the embodiment of the present invention.

Figure 4:
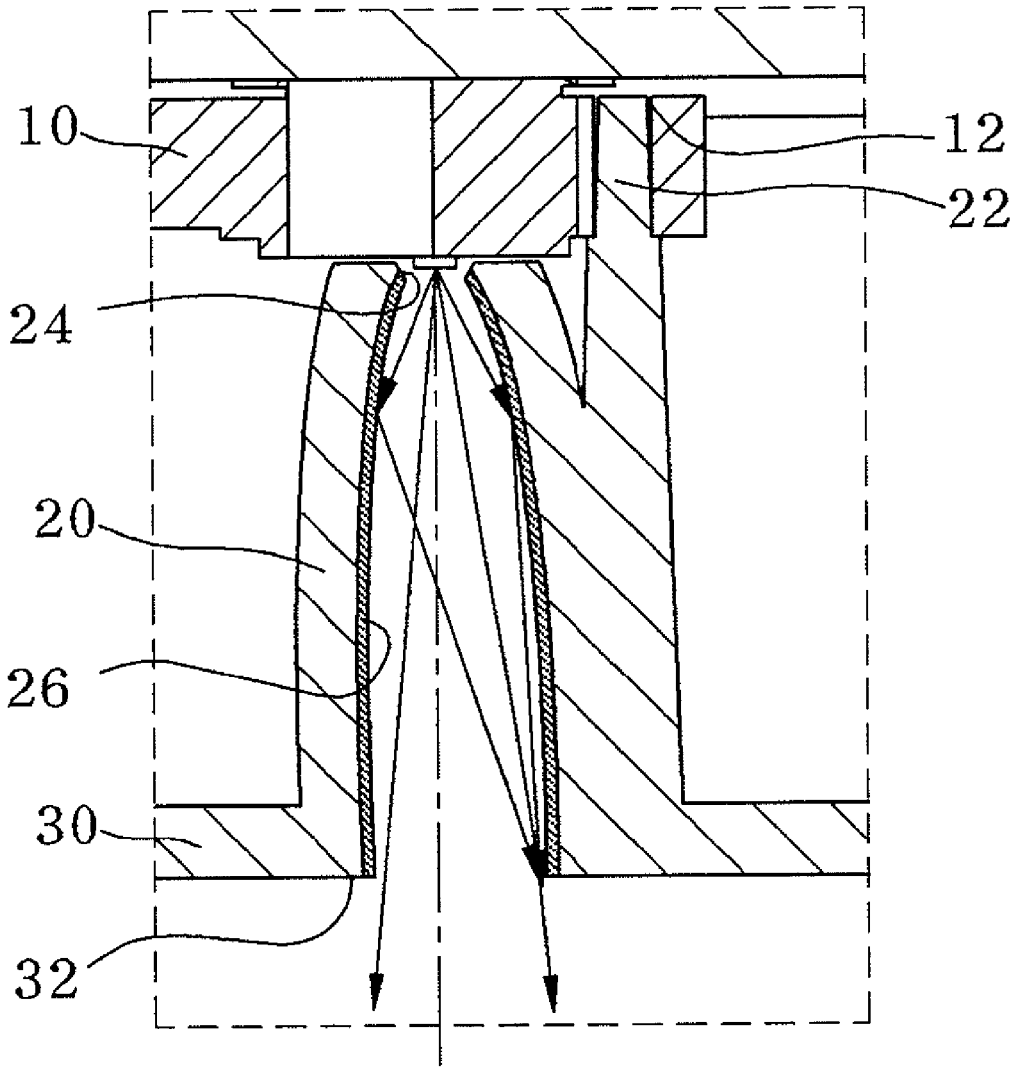
FIG. 4 is an enlarged view of part A shown in FIG. 3.
Figure 5:
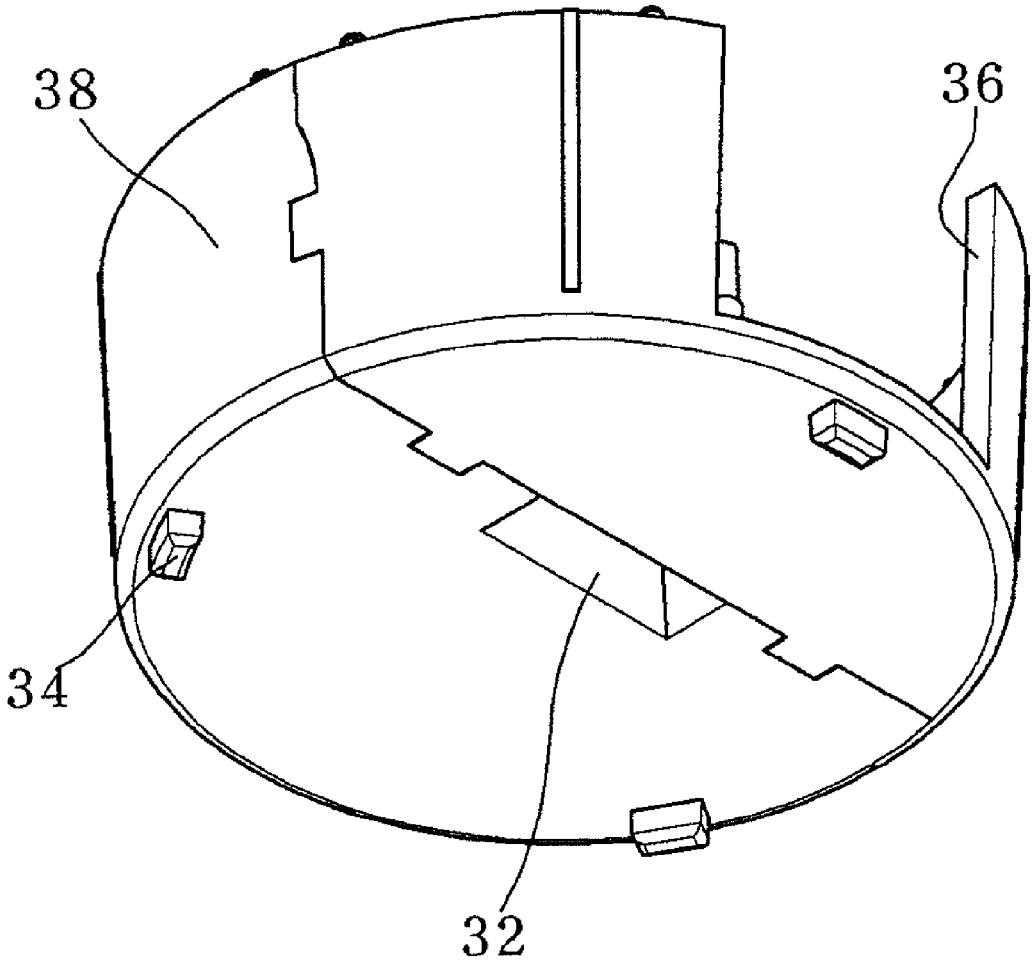
FIG. 5 is a perspective view of a shield of the head lamp according to the embodiment of the present invention.
Figure 6:
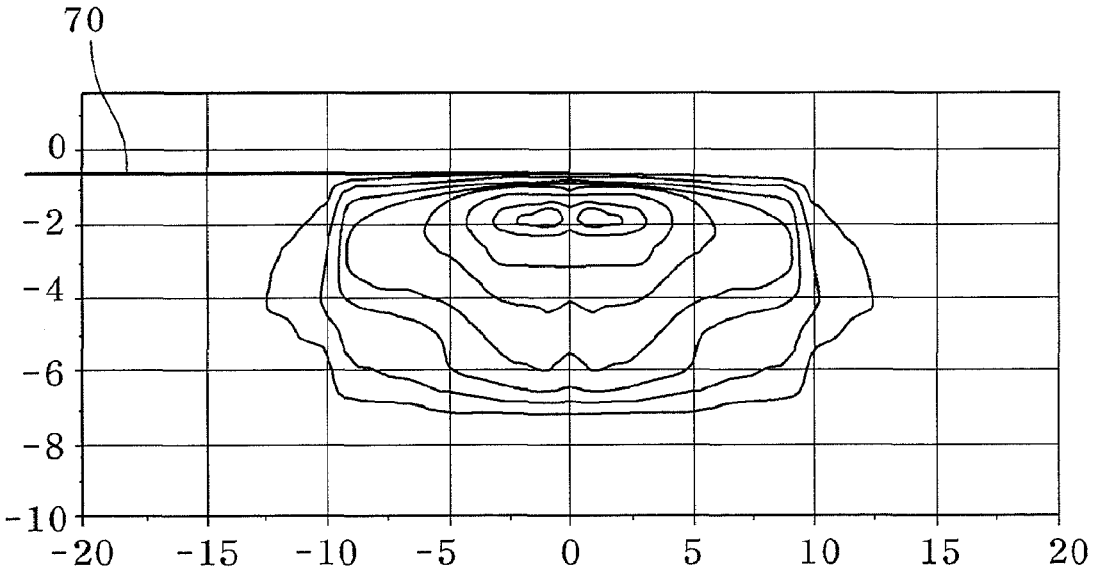
FIG. 6 is a diagram illustrating a distribution pattern of light emitted from the head lamp according to the embodiment of the present invention.

FIG. 4 is an enlarged view of part A shown in FIG. 3, FIG. 5 is a perspective view of a shield of the head lamp according to the embodiment of the present invention, and FIG. 6 is a diagram illustrating a distribution pattern of light emitted from the head lamp according to the embodiment of the present invention.

Referring to FIGS. 1 to 6, a head lamp according to one embodiment of the present invention includes a light source 10 emitting light, a reflection plate 20 reflecting the emitted light toward a lens 40, a shield 30 integrally formed with the reflection plate 20 to block a portion of light illuminated toward the lens 40, a lens guide 50 receiving the lens 40 and the shield 30, and a heat sink 60 discharging heat from the light source to an outside.

When light is emitted from the light source 10, the light is reflected toward the lens 40 by the reflection plate 20 and is partially intercepted by the shield 30 while passing the shield 30.

Here, the lens 40 is an aspheric lens and the light having passed through the shield 30 illuminates in front of a vehicle when passing through the lens 40.

At this time, since the shield 30 is integrally formed with the reflection plate 20 to eliminate assembly tolerance therebetween, a separation between the shield 30 and the reflection plate 20 is kept constant.

Accordingly, the light reflected by the reflection plate 20 and passed through a through-hole 32 of the shield 30 described below can maintain a constant pattern, thereby accurately achieving a distribution pattern of light as desired in designing the head lamp.

The lens guide 50 has a cylindrical shape and is opened at opposite sides thereof such that the lens 40 is disposed on a front part of the lens guide 50 and the shield 30 is disposed on a rear part thereof.

Further, the lens guide 50 has a collar jaw 52 formed on an inner wall of the lens guide 50 such that the shield 30 is seated on the collar jaw 52. The collar jaw 52 is formed with insertion grooves 54 through which the shield 30 is fitted to the collar jaw 52.

The shield 30 has a panel shape and is inserted into the lens guide 50 to divide the interior of the lens guide 50 into the front part and the rear part.

The shield 30 has a guide panel 38 extending from a rim of the shield 30 toward the rear part of the shield 30 such that, when the shield 30 is received in the lens guide 50, the guide panel 38 is brought into close contact with the inner wall of the lens guide 50 to prevent movement of the shield 30 inside the lens guide 50.

Further, the shield 30 is formed with a through-hole 32 through which a portion of light emitted from the light source 10 passes. Here, the reflection plate 20 is integrally formed with the through-hole 32.

Further, the shield 30 has insertion protrusions 34 formed under the rim of the shield 30 so as to correspond to the insertion grooves 54, so that, when the shield 30 is received in the lens guide 50, the insertion protrusions 34 are inserted into the insertion grooves 54 and the guide panel 38 of the shield 30 is brought into close contact with the inner wall of the lens guide 50, thereby achieving coupling between the shield 30 and the lens guide 50.

The reflection plate 20 is formed with a seat-hole 24 that extends from the through-hole 32 to define a passage of light and serves as a seat on which the light source 10 is mounted. The seat-hole 24 is provided with coupling protrusions 22 which are fitted into the light source 10.

The passage defined in the reflection plate 20 has a curved shape such that the cross-sectional area of the passage gradually decreases toward the light source 10, and has a reflection layer 26 such as a mirror deposited on an inner wall of the reflection plate 20.

Therefore, light emitted in an upward or downward direction from the light source 20 is illuminated in the front direction after being reflected by the inner wall of the reflection plate 20, which has the curved shape and upon which the reflection layer 26 is deposited.

Additionally, the reflection plate 20 has a plurality of coupling protrusions 22 formed on the circumference of the passage, and the light source 10 has a plurality of coupling holes 12 corresponding to the coupling protrusions 22, so that the light source 10 can be fitted into the reflection plate 20.

At this time, since the coupling protrusions 22 are press-fitted into the corresponding coupling holes 12, the light source 10 can be accurately coupled to the reflection plate 20.

The light source 10 is provided with a heat dissipation sheet 14 attached to the heat sink 60. Thus, when fastening members inserted into mounting holes 58 of the lens guide 50 are fastened to the heat sink 60, the heat dissipation sheet 14 of the light source 10 comes into close contact with the heat sink 60, enabling heat dissipation.

Here, since coupling of the fastening members is apparent to those skilled in the art, a detailed description and illustration thereof will be omitted herein.

Next, operation of the head lamp according to the embodiment of the present invention will be described.

When assembling the head lamp, the light source 10 is first coupled to the shield 30, with which the reflection plate 20 is integrally formed, by press-fitting the coupling grooves 12 of the light source 10 onto the coupling protrusions 22 formed on the rim of the seat-hole 24 of the reflection plate 20.

Then, the shield 30 is inserted into the lens guide 50 on which the lens 40 is mounted, thereby completing assembly of the shield 30. At this time, the rim of the shield 30 is seated on the collar jaw 52 formed on the inner wall of the lens guide 50, and the guide panel 38 closely contacts the inner wall of the lens guide 50.

Additionally, the insertion protrusions 34 formed on the rim of the shield 30 are press-fitted into the insertion grooves 54 of the collar jaw 52, so that the shield 30 is accurately coupled inside the lens guide 50.

Then, an assembly of the light source 10, shield 30, lens guide 50 and lens 40 is coupled to the heat sink 60, thereby completing assembly of the head lamp. For this purpose, fastening members are inserted into the mounting holes 58 of the lens guide 50 and fastened to the heat sink 60 to couple the light source 10 to the heat sink 60.

After completing the assembly of the head lamp, a power line is connected to a contact bar 16 extending from the light source 10. For this purpose, portions of the lens guide 50 and the shield 30 are cut away to form connection parts 36 and 56 through which a connector (not shown) connected to the power line is coupled to the contact bar 16.

Thus, when power is applied to the head lamp, light is emitted from the light source 10 toward the reflection plate 20, by which the light is reflected in the front side and is directed toward the lens 40 through the through-hole 32 of the shield 30.

At this time, the light emitted from the light source 10 forms a specific pattern according to the shape of the through-hole 32 and constitutes a cut-off line 70 corresponding to an intension of a designer.

As a result, the head lamp can provide an accurate distribution pattern of light corresponding to the intension of the designer via reduction of assembly tolerance between components.

According to the present invention, the head lamp includes a reflection plate and a shield integrally formed together to eliminate assembly tolerance between the reflection plate and the shield, so that light emitted from a light source can be accurately illuminated to a lens, thereby realizing a desired pattern of light.

Further, in the head lamp according to the present invention, the light source is fitted into the reflection plate without a separate fastening member to reduce assembly tolerance between the light source and the reflection plate, thereby realizing an accurate pattern of light while reducing the number of components.

Moreover, in the head lamp according to the present invention, a heat sink is disposed on a back side of the light source such that the shield, reflection plate, light source, and heat sink are arranged in a line, thereby reducing volume of the head lamp while enabling an easy design of a heat dissipation path.

Although the present invention has been described with reference to the embodiments and the accompanying drawings, the embodiments and drawings are given by way of illustration only, and, it will be apparent to those skilled in the art that various modifications and equivalent other embodiments can be made without departing from the scope of the present invention.

In addition, although the present invention has been described with reference to the head lamp for vehicles as specifically disclosed herein, it should be noted that the present invention is not limited to the head lamp for vehicles and can be applied to other products.

Therefore, the scope and spirit of the invention is limited only by the claims set forth herein as follows.

What is claimed is:

1. A head lamp, comprising:

a light source emitting light;

a reflection plate reflecting the emitted light toward a lens;

a shield integrally formed with the reflection plate to intercept a portion of the light illuminated toward the lens; and a lens guide having a first opening and a second opening provided at respective ends of the lens guide, the shield being received within and closing the first opening, and the lens being mounted at and closing the second opening.

2. The head lamp according to claim 1, wherein the lens guide is provided with a collar jaw on which the shield is mounted, the collar jaw being formed with an insertion groove through which the shield is fitted into the collar jaw.

3. The head lamp according to claim 1, wherein the shield is formed with a through-hole through which a portion of light emitted from the light source passes, the through-hole being integrally formed with the reflection plate.

4. The head lamp according to claim 3, wherein the reflection plate has a seat-hole extending from the through-hole to define a passage of light and serving as a seat on which the light source is mounted, the seat-hole being formed with a coupling protrusion fitted into the light source.

5. The head lamp according to claim 1, further comprising:

a heat sink connecting the light source, wherein the lens guide is provided with a mounting hole to which the heat sink is fastened.

*6. The head lamp according to claim 1, wherein the light source, the reflection plate, and the shield are arranged such that at least a portion of light emitted from the light source passes through the shield without being reflected by the reflection plate.*

*7. The head lamp according to claim 1, wherein the light source comprises a light emitting diode configured to emit light both in an upward direction toward an upper reflection layer of the reflection plate and in a downward direction toward a lower reflection layer of the reflection plate.*

*8. The head lamp according to claim 1, wherein the shield and at least a portion of the reflection plate are receivable in the lens guide through the first opening.*

*9. An automotive lamp comprising:*

*a light source emitting light;*

*a reflection plate reflecting the emitted light toward a lens;*

*a shield comprising a through-hole through which a portion of the light passes toward the lens; and*

*a lens guide having a first opening and a second opening provided at respective ends of the lens guide, the shield being received within and closing the first opening, and the lens being mounted at and closing the second opening.*

*10. The automotive lamp according to claim 9, wherein the lens guide is configured to house the shield and at least a part of the reflection plate.*

*11. The automotive lamp according to claim 9, wherein the shield is fixed to the reflection plate.*

*12. The automotive lamp according to claim 9, further comprising a heat sink connected to the light source, wherein the heat sink is mounted to the lens guide.*

*13. The automotive lamp according to claim 9, wherein the light source, the reflection plate, and the shield are arranged such that at least a portion of light emitted from the light source passes through the shield without being reflected by the reflection plate.*

*14. The automotive lamp according to claim 9, wherein the light source comprises a light emitting diode configured to emit light both in an upward direction toward an upper reflection layer of the reflection plate and in a downward direction toward a lower reflection layer of the reflection plate.*

*15. The automotive lamp according to claim 9, wherein the reflection plate comprises an inner reflection layer defining an internal passage through which light from the light source passes, wherein the cross-sectional area of the passage gradually decreases toward the light source.*

*16. An automotive lamp comprising:*

*a light source comprising a light emitting diode configured to emit light;*

*a reflection plate comprising an upper reflection layer and a lower reflection layer, wherein the light emitted from the light emitting diode in an upward direction is reflected by the upper reflection layer toward a lens, and the light emitted from the light emitted diode in a downward direction is reflected by the lower reflection layer toward the lens;*

*a shield comprising a through-hole and disposed between the reflection plate and the lens, wherein the shield is configured to intercept a portion of the emitted light while permitting passage of the emitted light through the through-hole; and*

*a lens guide comprising a front part and a rear part and configured to hold the lens in the front part and the shield in the rear part, the lens guide having a first opening and a second opening provided at respective ends of the lens guide, the shield being received within and closing the first opening, and the lens being mounted at and closing the second opening.*

*17. The automotive lamp according to claim 16, wherein the shield is fixed to the reflection plate.*

*18. The automotive lamp according to claim 16, further comprising a heat sink connected to the light source, wherein the heat sink is mounted to the lens guide.*

*19. The automotive lamp according to claim 16, wherein the light source, the reflection plate, and the shield are arranged such that at least a portion of light emitted from the light source passes through the through-hole of the shield without being reflected by the reflection plate.*

*20. The automotive lamp according to claim 16, wherein the upper and lower reflection layers of the reflection plate define an internal passage through which the light from the light emitting diode passes, wherein the cross-sectional area of the passage gradually decreases toward the light source.*

*21. The automotive lamp according to claim 16, wherein the light emitting diode comprises a light emitting surface*

*generally facing in a direction parallel to a longitudinal axis of an internal passage defined by the upper and lower reflection layers of the reflection plate.*

*22. The automotive lamp according to claim 16, wherein the rear part is configured to house the shield and at least a part of the reflection plate.*

* * * * *